April 7, 1953  W. J. CHIEVITZ  2,634,178
ADJUSTABLE BEARING RETAINER ASSEMBLY
Filed Feb. 4, 1952
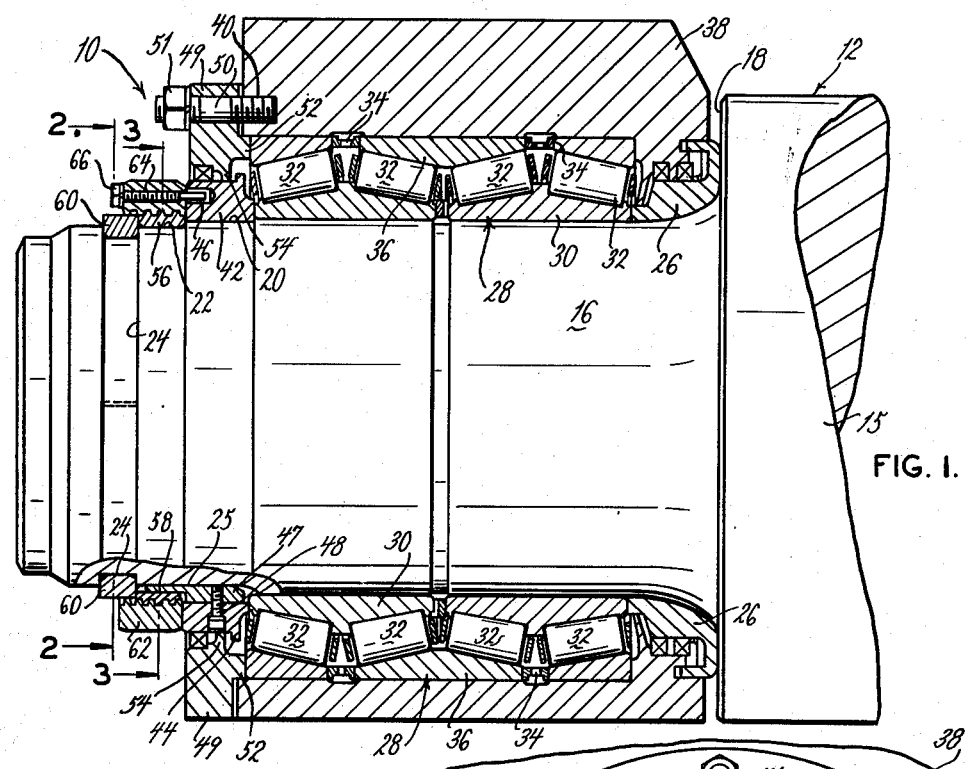
FIG. 1.
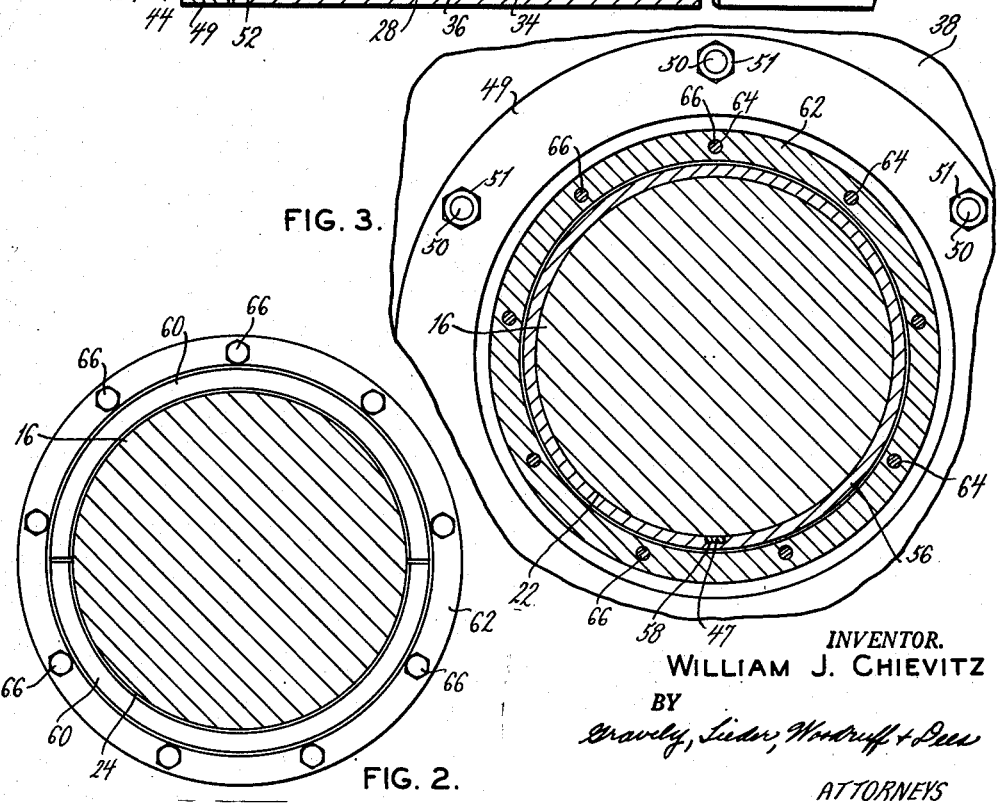
FIG. 3.
FIG. 2.
INVENTOR.
WILLIAM J. CHIEVITZ
BY
*Gravely, Lieder, Woodruff & Bees*
ATTORNEYS Patented Apr. 7, 1953

2,634,178

UNITED STATES PATENT OFFICE 2,634,178

ADJUSTABLE BEARING RETAINER ASSEMBLY

William J. Chievitz, Canton, Ohio, assignor to The Timken Roller Bearing Company, Canton, Ohio, a corporation of Ohio Application February 4, 1952, Serial No. 269,859

9 Claims. (Cl. 308—207)

The present invention relates generally to the bearing art and more particularly to a novel adjustable bearing retainer assembly which is particularly applicable for use on mill roll necks, and the like.

In the known constructions, the bearings are adjustably mounted on the necks of the mill rolls by means including an adjusting nut threadedly mounted on an externally threaded split thrust ring. This type of construction is not completely satisfactory because when the threaded thrust ring is cut in half, the metal removed by the cutter leaves spaces between the ends of the ring segments so that when the ring is mounted on the roll neck these spaces have to be compensated for by positioning the ring segments in the same relative positions they occupied prior to the cutting operation. Working conditions in steel mill maintenance makes it difficult to do this properly. It is necessary to use small screws or pins in an effort to hold the ring segments in their correct relative positions, and, if the grooves in which they are disposed permit an appreciable amount of axial play, or if the ring segments merely shift circumferentially to close one saw cut, the threads will not register. Consequently, it is very difficult and ofttimes impossible to start the adjusting nut on the externally threaded split ring.

It is an object of the present invention therefore, to provide a novel adjustable bearing retainer assembly in which the adjusting nut is threaded onto a member which contains continuous external threads. More particularly, it is an object to provide such an assembly which employs a solid externally threaded adjusting ring on which the adjusting nut can be easily and quickly threaded, and which can be slipped into position over the free end of the mill roll neck.

Another object is to provide a novel adjustable bearing retainer assembly which contains relatively few parts which are simple in construction and capable of being installed easily and quickly without having to use special tools.

The adjustable bearing retainer assembly which is the subject matter of the present invention, is mounted on the end of a shaft which is rotatably mounted in a supporting housing and which has bearing means interposed between the shaft and the housing; and, briefly includes a thrust ring which is keyed to the shaft and disposed against the outer end of the bearing means; an annular adjusting ring having continuous external threads and keyed to the shaft adjacent the thrust ring; a split backing ring disposed in a groove in the shaft and against the adjusting ring; and an adjusting nut threadedly mounted on the adjusting ring so as to bear against the thrust ring, there being inter-engaging means between the adjusting nut and thrust ring to selectively lock them together in adjusted rotated position.

In the drawing:

Fig. 1 is a vertical diametrical sectional view of an adjustable bearing retainer assembly constructed in accordance with the teachings of the present invention, shown mounted on a conventional mill roll neck, the latter being shown in elevation;

Fig. 2 is a vertical transverse sectional view taken on the line 2—2 in Fig. 1, and Fig. 3 is a vertical transverse sectional view taken on the line 3—3 in Fig. 1.

Referring to the drawing more particularly by reference numerals, 10 indicates generally an adjustable bearing retainer assembly constructed in accordance with the teachings of the present invention, shown mounted on a mill roll 12.

The mill roll 12 includes a body portion 15 and a neck portion 16 which is of reduced diameter so as to provide a shoulder 18 between them. Toward the end of the neck portion 16 there is a portion of reduced diameter which forms a first ledge or shelf 20. A further reduced portion adjacent the first ledge 20 provides a second ledge 22, and immediately adjacent the latter is a circumferential groove 24 of rectangular cross section. It will be noted from Fig. 1 that the extreme end portion of the mill neck 16 is no greater in diameter than the outside diameter of the second ledge 22, for a purpose to appear.

An axially extending key slot 25 is formed in the bottom part of the roll neck 16 (Fig. 1) and extends approximately the width of the first and second shelves 20 and 22.

Mounted on the roll neck 16 against the shoulder 18 is a spacing ring 26. A bearing assembly 28 is also disposed on the roll neck 16 in abutting relationship with the spacing ring 26, and includes a double-cone inner-raceway 30, a plurality of roller bearings 32, cages 34, and an outer raceway 36. The bearing assembly 28 is of conventional construction and forms no part of the present invention.

Disposed about the bearing assembly 28 is a supporting housing 38 which contains a plurality of spaced internally threaded openings 40 in its outer face.

A thrust ring 42 is positioned on the first shelf 20 so as to be in contact with the outer end of the bearing assembly 28 and maintain it in adjusted position against the spacing ring 26. The thrust ring 42 contains a radially outwardly extending flange portion 44 adjacent its inner end and a plurality of spaced cavities 46 in its outer face.

A stepped key 47 is disposed in the key slot 25 and the thrust ring 42 is removably fastened thereto by means of a machine screw 48. It will be noted that the length of the key 47 is slightly less than the length of the slot 25 to permit the key and thrust ring 42 to move together axially a limited distance relative to the roll neck 16. However, it will be apparent that the key 47 prevents the thrust ring 42 from rotating relative to the roll neck 16.

A thrust ring retainer 49 is removably fastened to the outer face of the bearing housing 38 by means of threaded studs 50 and nuts 51, the end of the studs being threadedly disposed in the openings 49. The thrust ring retainer 49 is in radial alignment with the thrust ring 42, and contains an axially extending projecting portion 52 which abuts the outer face of the outer raceway 36, and a radially inwardly extending flange portion 54 which is disposed outwardly of the flange portion 44 of the thrust ring 42 so as to limit the outward axial movement of the latter.

Disposed on the second ledge 22 of the roll neck 16 is a solid externally threaded adjusting ring 56 which contains a groove 58 in the inner face thereof which receives the outer end portion of the key 47. Thus, the adjusting ring 56 and the thrust ring 42 are keyed together and to the roll neck 16 so as to rotate with it. However, it will be noted that the adjusting ring 56 can move axially relative to the thrust ring 42 even though they are both disposed on the same key.

Disposed in the groove 24 in the roll neck 16 is a smooth split backing ring 60 (Fig. 2) which abuts the threaded adjusting ring 56 so as to limit its outward axial movement. It will be noted from Fig. 1 that the outside diameter of the backing ring 60 is slightly less than the diameter of the adjusting ring 56 at the base of its threads, for a purpose to appear.

An internally threaded adjusting nut 62 is threadedly disposed on the adjusting ring 56, and, as shown in Fig. 1, the width thereof is greater than the width of the adjusting ring 56 so that it extends over the split ring 60 and prevents the outward radial movement of the ring segments.

A plurality of internally threaded spaced openings 64 are contained in the adjusting nut 62 in alignment with the cavities 46, and, disposed in the former are bolts 66 which have smooth free ends projecting into the cavities 46 so as to maintain the adjusting nut 62 in selected rotated position relative to the thrust ring 42 and the adjusting ring 56.

Operation

To assemble or replace the adjustable bearing retainer assembly 10 on the roll neck 16, the key 47 is first inserted in the key slot 25 and the thrust ring 42 slipped over the end of the roll neck 16 onto the first shelf 20 and onto the key 47. The thrust ring 42 is then fastened to the key 47 by means of the machine screw 48.

The thrust ring retainer 49 is then slipped into position and fastened to the face of the housing by means of the bolts 50 and nuts 51. This locks the thrust ring 42 in position because the radially inwardly extending flange portion 54 of the retainer is outside of the radially outwardly extending flange portion 44 of the ring. However, as previously described, the thrust ring 42 has limited axial movement relative to the roll neck 16 because of the space between the flange portions 44 and 54, and because the key 47 is shorter than its slot 25.

The solid adjusting ring 56 is then slipped onto the second shelf 22 over the key 47, the latter preventing the ring 56 from rotating relative to the roll neck 16 or the thrust ring 42.

The segments of the split backing ring are then disposed in the groove 24, thereby holding the adjusting ring 56 in position.

While the segments of the split ring 60 are being held in position, the adjusting nut 62 is slipped over them and threaded onto the adjusting ring 56. Because the threads of the adjusting ring 56 are continuous, the adjusting nut 62 can be easily and quickly threaded on it. It will also be noted that the adjusting nut 62 extends over the split ring 60 so as to maintain the segments in the groove 24.

The adjusting nut 62 is then rotated relative to the adjusting ring 56 so as to move the thrust ring 42 inwardly until the bearing assembly 28 is properly positioned between the spacing ring 26 and the thrust ring 42, the thrust ring 42 bearing against the outer end of the inner-raceway 30.

The thrust from the end of the raceway 30 is transmitted through the adjusting nut 62 and adjusting ring 56 to the split backing ring 60 which bears against the outer wall of the groove 24.

When the adjusting nut 62 is in the proper rotated position, the bolts 66 are turned inwardly until the smooth ends thereof are disposed in the cavities 46, thereby locking together the adjusting nut 62, the adjusting ring 56, and the thrust ring 42. The cavities 46 in the thrust ring 42 are spaced close enough together to permit relatively fine adjustment of the adjusting nut 62.

Thus, it is apparent that there has been provided a novel adjustable bearing retainer assembly which fulfills all of the objects and advantages sought therefor.

The externally threaded adjusting ring 56 is solid and has continuous threads so that it is very easy to threadedly engage the adjusting nut 62 with it. The backing ring 60 is split, but because it is smooth and does not have to be in alignment with any other part, it does not make any difference if the space between the segment ends on one side is different from the space on the other side, or even if the ends on one side are in contact. Furthermore, the segments can even be of different thicknesses and different widths and still operate satisfactorily.

The adjusting nut 62 holds the segments of the split backing ring 60 in position on the roll neck 16, both while it is being threaded onto the adjusting ring 56 and after it is in position, so that there is no possibility of having the backing ring segments fall off the roll neck 16 once the adjusting nut 62 is started over them.

Furthermore, the component parts of the retainer assembly 10 are relatively few in number and of simple construction and can be easily and quickly installed using standard tools.

It is to be understood that the foregoing description and the accompanying drawing has been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described, comprising a supporting housing; a shaft having an outer end rotatably mounted in the housing; bearing means having outer and inner ends interposed between the shaft and the housing; means limiting the inward axial movement of the bearing means on the shaft; an annular member with continuous external threads mounted on the shaft adjacent the outer end of the bearing means; a segmented ring disposed on the shaft in abutting relationship with the threaded annular member; means limiting the outward axial movement of the segmented ring on the shaft; a nut threadedly mounted on the annular member; and means associated with the nut for engaging the outer end of the bearing means whereby the axial position of the bearing means can be adjusted by relative rotation between the nut and the annular member.

2. A device of the type described, comprising a supporting housing; a shaft having an outer end rotatively mounted in the housing; bearing means having outer and inner ends interposed between the shaft and the housing; means limiting the inward axial movement of the bearing means on the shaft; an annular member with continuous external threads mounted on the shaft adjacent the outer end of the bearing means; a segmented ring disposed on the shaft in abutting relationship with the threaded annular member; means limiting the outward axial movement of the segmented ring on the shaft; a nut threadedly mounted on the annular member; and means associated with the nut for engaging the outer end of the bearing means whereby the axial position of the bearing means can be adjusted by relative rotation between the nut and the annular member; the nut extending over at least a portion of the outer peripheral surface of the segmented ring so as to limit the outer radial movement of its segments.

3. A device of the type described, comprising a supporting housing; a shaft having an outer end rotatably mounted in the housing; bearing means having outer and inner ends interposed between the shaft and the housing; means limiting the inward axial movement of the bearing means on the shaft; an annular member with continuous external threads mounted on the shaft adjacent the outer end of the bearing means; a segmented ring disposed on the shaft in abutting relationship with the threaded annular member, the outer diameter of the segmented ring being less than the maximum outer diameter of the threaded annular member; means limiting the outward axial movement of the segmented ring on the shaft; a nut threadedly mounted on the annular member, the nut extending over at least a portion of the outer peripheral surface of the segmented ring so as to limit the outer radial movement of its segments; and means associated with the nut for engaging the outer end of the bearing means whereby the axial position of the bearing means can be adjusted by relative rotation between the nut and the threaded annular member.

4. A device of the type described, comprising a supporting housing; a shaft having an outer end rotatably mounted in the housing; bearing means having outer and inner ends interposed between the shaft and the housing; means limiting the inward axial movement of the bearing means on the shaft; an annular member with continuous external threads mounted on the shaft adjacent the outer end of the bearing; means preventing rotation of the threaded annular member relative to the shaft; a segmented ring disposed on the shaft against the threaded annular member; means limiting the outward axial movement of the segmented ring on the shaft; a nut threadedly mounted on the annular member; means associated with the nut for engaging the outer end of the bearing means whereby the axial position of the bearing means can be adjusted by rotation of the nut relative to the shaft; and means for selectively locking the nut in position to prevent it from rotating relative to the shaft.

5. A device of the type described, comprising a supporting housing; a shaft having an outer end rotatably mounted in the housing; bearing means having outer and inner ends interposed between the shaft and the housing; means limiting the inward axial movement of the bearing means on the shaft; a thrust ring disposed on the shaft against the outer end of the bearing means and having limited axial movement relative to the shaft; means preventing rotational movement of the thrust ring relative to the shaft; an annular member with external threads disposed on the shaft adjacent the thrust ring and being free to move axially relative to the shaft; means preventing rotational movement of the annular member relative to the shaft; means limiting the outward axial movement of the annular member relative to the shaft; a nut threadedly mounted on the annular member and adapted to abut the thrust ring to force the latter against the outer end of the bearing means; and interengaging means on the nut and the thrust ring to selectively lock them together to prevent rotation of the nut relative to the threaded annular member.

6. A device of the type described, comprising a supporting housing; a shaft having an outer end rotatably mounted in the housing; bearing means having outer and inner ends interposed between the shaft and the housing; means limiting the inward axial movement of the bearing means on the shaft; a thrust ring disposed on the shaft against the outer end of the bearing means and having limited axial movement relative to the shaft; means preventing rotational movement of the thrust ring relative to the shaft; an annular member with external threads disposed on the shaft adjacent the thrust ring and movable axially relative to the shaft; means preventing rotational movement of the annular member relative to the shaft; a segmented ring disposed on the shaft against the threaded annular member, the outer diameter of the segmented ring being less than the maximum outer diameter of the annular member; means limiting the outward axial movement of the segmented ring; and a nut threadedly mounted on the annular member and adapted to abut the thrust ring to force the latter against the outer end of the bearing, the nut extending over at least a portion of the outer peripheral surface of the segmented ring so as to limit the outer radial movement of its segments.

7. A device of the type described, comprising a supporting housing; a shaft having an outer end rotatably mounted in the housing; bearing means having outer and inner ends interposed between the shaft and the housing; means limiting the inward axial movement of the bearing means on the shaft; a thrust ring disposed on the shaft against the outer end of the bearing means and having limited axial movement relative to the shaft; means preventing rotational movement of the thrust ring relative to the shaft; an annular member with external threads disposed on the shaft adjacent the thrust ring and movable axially relative to the shaft; means preventing rotational movement of the annular member relative to the shaft; a circumferential groove in the shaft and a segmented ring disposed in the groove so as to bear against the threaded annular member, the outer diameter of the segmented ring being less than the maximum outer diameter of the annular member; and a nut threadedly mounted on the annular member and adapted to abut the thrust ring to force the latter against the outer end of the bearing, the nut extending over at least a portion of the outer peripheral surface of the segmented ring so as to limit the outer radial movement of its segments.

8. A device of the type described, comprising a supporting housing; a shaft having an outer end rotatably mounted in the housing; bearing means having outer and inner ends interposed between the shaft and the housing; means limiting the inward axial movement of the bearing means on the shaft; a thrust ring disposed on the shaft against the outer end of the bearing means and having limited axial movement relative to the shaft; means preventing rotational movement of the thrust ring relative to the shaft; an annular member with external threads disposed on the shaft adjacent the thrust ring and movable axially relative to the shaft; means preventing rotational movement of the annular member relative to the shaft; a circumferential groove in the shaft and a segmented ring disposed in the groove so as to bear against the threaded annular member, the outer diameter of the segmented ring being less than the maximum outer diameter of the annular member; a nut threadedly mounted on the annular member and adapted to abut the thrust ring to force the latter against the outer end of the bearing, the nut extending over at least a portion of the outer peripheral surface of the segmented ring so as to limit the outer radial movement of its segments; and means for selectively locking together the nut and the thrust ring to prevent rotation of the nut relative to the threaded annular member.

9. A device of the type described, comprising a supporting housing; a shaft having an outer end rotatably mounted in the housing; bearing means having outer and inner ends interposed between the shaft and the housing; means limiting the inward axial movement of the bearing means on the shaft; a thrust ring disposed on the shaft against the outer end of the bearing means and having limited axial movement relative to the shaft; means preventing rotational movement of the thrust ring relative to the shaft; an annular member with external threads disposed on the shaft adjacent the thrust ring and movable axially relative to the shaft; means preventing rotational movement of the annular member relative to the shaft; a circumferential groove in the shaft and a segmented ring disposed in the groove so as to bear against the threaded annular member, the outer diameter of the segmented ring being less than the maximum outer diameter of the annular member; a nut threadedly mounted on the annular member and adapted to abut the thrust ring to force the latter against the outer end of the bearing, the nut extending over at least a portion of the outer peripheral surface of the segmented ring so as to limit the outer radial movement of its segments; the thrust ring containing a plurality of spaced cavities in its outer face, and the nut containing a plurality of spaced internally threaded passageways adjacent its outer periphery which are in alignment with said cavities; and bolts threadedly disposed in said passageways and having the inner ends thereof projecting into the cavities so as to prevent rotation of the nut relative to the thrust ring.

WILLIAM J. CHIEVITZ.

REFERENCES CITED

The following references are of record in the file of this patent:

UNITED STATES PATENTS

| Number | Name | Date |
| --- | --- | --- |
| 1,579,737 | Sweet | Apr. 6, 1926 |
| 1,813,315 | Peterman | July 7, 1931 |
| 2,113,017 | Deschamps | Apr. 5, 1938 |

FOREIGN PATENTS

| Number | Country | Date |
| --- | --- | --- |
| 459,265 | Great Britain | Jan. 5, 1937 |